United States Patent
Whitcome

[19]

[11] Patent Number: 6,145,495
[45] Date of Patent: Nov. 14, 2000

[54] PROPANE INJECTION SYSTEM FOR A DIESEL ENGINE

[75] Inventor: John P. Whitcome, Preston, Id.

[73] Assignee: Daryl J. Klassen, Aberdeen, Id.

[21] Appl. No.: 09/298,271

[22] Filed: Apr. 23, 1999

[51] Int. Cl.$^7$ .................................................. F02M 21/02
[52] U.S. Cl. ...................................... 123/525; 123/27 GE
[58] Field of Search ................................. 123/27 GE, 525

[56] References Cited

U.S. PATENT DOCUMENTS

| | | | |
|---|---|---|---|
| 2,775,981 | 1/1957 | Zonker | 137/505.12 |
| 4,385,615 | 5/1983 | Keane | 123/514 |
| 4,413,607 | 11/1983 | Batchelor et al. | 123/590 |
| 4,440,137 | 4/1984 | Lagano et al. | 123/525 |
| 4,453,523 | 6/1984 | Poehlman | 123/525 |
| 4,463,734 | 8/1984 | Akeroyd | 123/27 GE |
| 4,513,727 | 4/1985 | Lagano et al. | 123/525 |
| 4,535,728 | 8/1985 | Batchelor | 123/27 GE |
| 4,829,957 | 5/1989 | Garretson et al. | 123/27 GE |
| 4,953,515 | 9/1990 | Fehr et al. | 123/526 |
| 5,499,615 | 3/1996 | Lawrence et al. | 123/526 |
| 5,713,426 | 2/1998 | Okamura | 180/65.3 |

FOREIGN PATENT DOCUMENTS

| | | | |
|---|---|---|---|
| 59-29758 | 2/1984 | Japan | 123/525 |
| 60-162046 | 8/1985 | Japan | 123/525 |

*Primary Examiner*—Noah P. Kamen
*Attorney, Agent, or Firm*—Robert L. Shaver; Frank J. Dykas

[57] ABSTRACT

A supplemental fuel regulator for diesel engines, and a system for adding supplemental fuel to diesel engines is provided. The fuel regulator has two chambers, one which receives fuel from the fuel tank through a fuel inlet valve, which also reduces the pressure of the fuel. The fuel at much reduced pressure is passed to a second chamber through a fuel control valve. Fuel is drawn from the second chamber into an outlet duct, directly into the airflow duct of the diesel engine. A vacuum line from the engine pulls fuel from the second chamber. As engine demand increases, the engine vacuum increases, and additional fuel is supplied by the regulator. A solenoid switch provides control over the system, which can be activated by a user when the supplemental fuel system is deemed desirable. The solenoid switch can be configured to shut off the supplemental fuel system whenever the diesel engine is shut off.

5 Claims, 6 Drawing Sheets

PROPANE INJECTION SYSTEM FOR A DIESEL ENGINE

BACKGROUND OF THE INVENTION

1. Field of the Invention

The present invention generally relates to fuel regulators, and more specifically to fuel regulators which allow propane or other gasses to be injected into the air intake system of an internal combustion engine, particularly a diesel engine.

2. Background Information

It has long been known that injecting propane, butane, or other gasses into internal combustion engines, such as diesel engines, improves the performance of these engines. The injection of supplemental fuel such as propane increases power and mileage, and decreases operating costs. A number of regulators have been devised which are designed to control the admission and mixing of propane or other gasses into the air intake of a diesel engine. These devices have suffered from various drawbacks. One type of device has been a device which is placed inside a duct of the air intake system of the engine. The device partially obstructs the flow of the air intake tube. As the diesel engine pulls air through the tube and around the propane fuel regulating device, the flow of air around the device actuates the regulator to inject propane gas into the air stream flowing by the regulator. This type of device suffers from several disadvantages. Since it is placed directly in the airflow of the diesel engine, and operates by partially obstructing the flow of air, it is inevitable that this kind of device reduces the performance of a diesel engine by starving it of air. This type of device is also not very practical because the air intake ducting of the various diesel engines in production are all different in internal diameter and conformation. Therefore, one regulator of this type could not be built which fits all of the diesel engines in production. Instead, many different sizes of this type of regulator would have to be built, one for each intake system made for diesel engines. Further, it is costly and time consuming to install such devices into the air intake ducting.

Other regulators have been devised which are external to the air intake ducting of a diesel engine. Some of these devices are complicated in nature, making their manufacture expensive, and making them subject to failure and misadjustment in operation. Some of these devices also are installed as permanent and automatic supplemental fuel injectors, so that supplemental fuel is injected as soon as the engine is started, and throughout operation of the engine. This is not always desirable.

Therefore, it is an object of the invention to provide a supplemental fuel regulating system which can be installed on diesel engines of many sizes and configurations. It is a further object of the invention that the supplemental fuel regulating system supply supplemental fuel, such as propane, to the diesel engine based upon the varying requirements or demand of the engine. This would result in varying flows of propane for varying RPM's of the engine, to account for idling needs, acceleration needs, cruising needs, and power shut-off.

A still further object of the invention is to provide a supplemental fuel regulator which can be switched on or off at the operator's discretion, to allow the engine to operate as a conventional diesel engine, or to add supplemental fuel to the diesel engine.

It is a further object of the invention to provide a supplemental fuel regulator and regulation system which injects supplemental fuel into the air intake duct of a diesel engine.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These and other objects and advantages are attained by a propane regulator and a propane injection system for diesel engines. One aspect of the invention is a regulator for controlling the injection of a supplemental fuel into a diesel engine. The primary fuel of the diesel engine would be diesel fuel, and the supplemental fuel would be propane, butane, isobutane, or other fuels which can be injected as a gas into the diesel engine. The diesel engine has an airflow duct which is part of the air intake system of the diesel engine. The regulator controls the flow of supplemental fuel into the airflow duct of a diesel engine.

The regulator of the invention is made including a body casing. The body casing has recesses on either side of it, separated by a partition wall. The first and second recesses are closed off by a first and second diaphragm. The first diaphragm forms one side of the first recess and thereby defines a first chamber. The first chamber is a chamber into which fuel from the fuel tank is admitted through a valve. The fuels typically used as supplemental fuels for diesel have a fairly high vapor pressure, and pressures of 250 pounds or more would be expected in the fuel tank and fuel lines. The pressure in the first chamber is much less than the pressure in the fuel tank and fuel lines. A fuel inlet valve is provided which, by use of a maximum pressure adjusting means, keeps the pressure in the first chamber at a selected level.

A second diaphragm forms one side of the second recess, to provide a second chamber, into which fuel from the first chamber is admitted. From the second chamber, fuel is routed to the airflow duct of a diesel engine through a fuel outlet port.

In the partition wall between the first and second chambers is a fuel control valve, which controls the flow of fuel from the first chamber to the second chamber. A fuel flow adjusting means is provided for control of this flow. A fuel outlet port passes through the body casing of the second chamber, to allow fuel to flow from the second chamber to the airflow duct of the diesel engine. The fuel outlet port is connected to a vacuum line from the diesel engine, which withdraws fuel from the second chamber and pulls it into the airflow duct of the diesel engine.

It is important to note that the fuel regulator does not replace a diesel engine's use of diesel fuel as a prime fuel. It merely gives the operator the option of supplementing the diesel fuel with a gas, such as propane. The fuel regulator is also located outside of the air duct, but connected to it by a vacuum line. By this configuration, the fuel regulator can be added to diesel engines of any size and configuration, since it is not located inside the airflow duct itself.

The fuel regulator can also include a first end cap, which attaches to the body casing over the first diaphragm and the first chamber. Built into the first end cap is a spring which presses against the first diaphragm, applying varying and yielding pressure to the diaphragm. The spring is adjusted by a spring adjusting means, normally a tensioning screw located in the first end cap. By adjusting the tensioning screw, the spring presses down on the first diaphragm, deflecting it towards the partition wall.

The fuel regulator can also include a second end cap, which attaches to the body casing over the second diaphragm and the second chamber.

The means of adjusting the maximum pressure of the first chamber includes the first diaphragm which is deflected by a spring, a spring tensioning screw which is used to adjustably bias the spring, and a lever which is attached to the diaphragm and which is operatively connected to the fuel inlet valve.

The fuel inlet valve of the supplemental fuel regulator includes a valve body which contains an orifice which passes through it. A plunger seat is located at one end of the orifice, through which fuel flows. A plunger is part of the fuel inlet valve. The plunger is tapered on one end, and it serves to adjustably block the orifice by contacting the plunger seat. A spring is included, which is biased to press the plunger into the plunger seat of the orifice. Finally, a cap connects to the valve body and holds the spring in biased engagement with the plunger inside the orifice of the valve body. In this valve, when the plunger is pressed away from engagement with the valve seat, fuel is allowed to flow through the orifice, and when the plunger is pressed into the valve seat, fuel is blocked from flowing through the fuel inlet valve.

The fuel flow adjusting means of the regulator includes the second diaphragm, which is deflected based on engine demand, and which is attached to said fuel control valve by a fuel control valve lever. When the engine demand increases or decreases, the second diaphragm is moved in or out, and causes the fuel control valve lever to open or close the fuel control valve to admit more or less fuel from the first chamber into the second chamber. The diaphragm is deflected when the vacuum from the engine pulls fuel out of the second chamber. Engine demand is transmitted to the fuel flow adjusting means by means of a vacuum transmitted from the diesel engine to the fuel control means.

The fuel control valve of the supplemental fuel regulator includes a valve body through which an orifice through which fuel flows. It includes a plunger seat at one end of the orifice, and a plunger which adjustably blocks the orifice. It also includes a spring which is biased to press the plunger into the plunger seat of the orifice. When the plunger is pressed away from engagement with said valve seat, fuel is allowed to flow through the orifice, and when the plunger is pressed into the valve seat, fuel is blocked from flowing through the fuel inlet valve.

A solenoid valve can be utilized with the regulator, for activation or deactivation of said fuel regulator.

Another aspect of the invention is as a supplemental fuel injection system for introducing a gaseous supplemental fuel such as propane into an airflow system and an airflow duct, which feeds air into diesel engines for combustion as a supplemental fuel. The system includes a regulator, which is located outside the airflow duct, and which supplies supplemental gaseous fuel to said diesel engine. The regulator is as described above. The system also includes a solenoid switch for activating or deactivating the supplemental fuel injection system. A fuel vapor tank for storing fuel in liquid form is also part of the system, for storing fuel, and passing vaporized fuel to the regulator. The system also includes a fuel inlet line for delivering gaseous fuel to the fuel regulator. Also included in the system is a fuel outlet line, for delivering gaseous fuel from the second chamber of the fuel regulator to the airflow system of the diesel engine. The fuel outlet line attaches to a fuel outlet port, which passes through the body casing wall into the second chamber, and is connected to a vacuum line from the diesel engine, and from which fuel is drawn from the second chamber into the airflow duct of the diesel engine. As fuel is removed from the second chamber, the evacuation causes a movement of the lower diaphragm, thus opening the fuel control valve and admitting additional fuel from the first chamber into the second chamber.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 1:
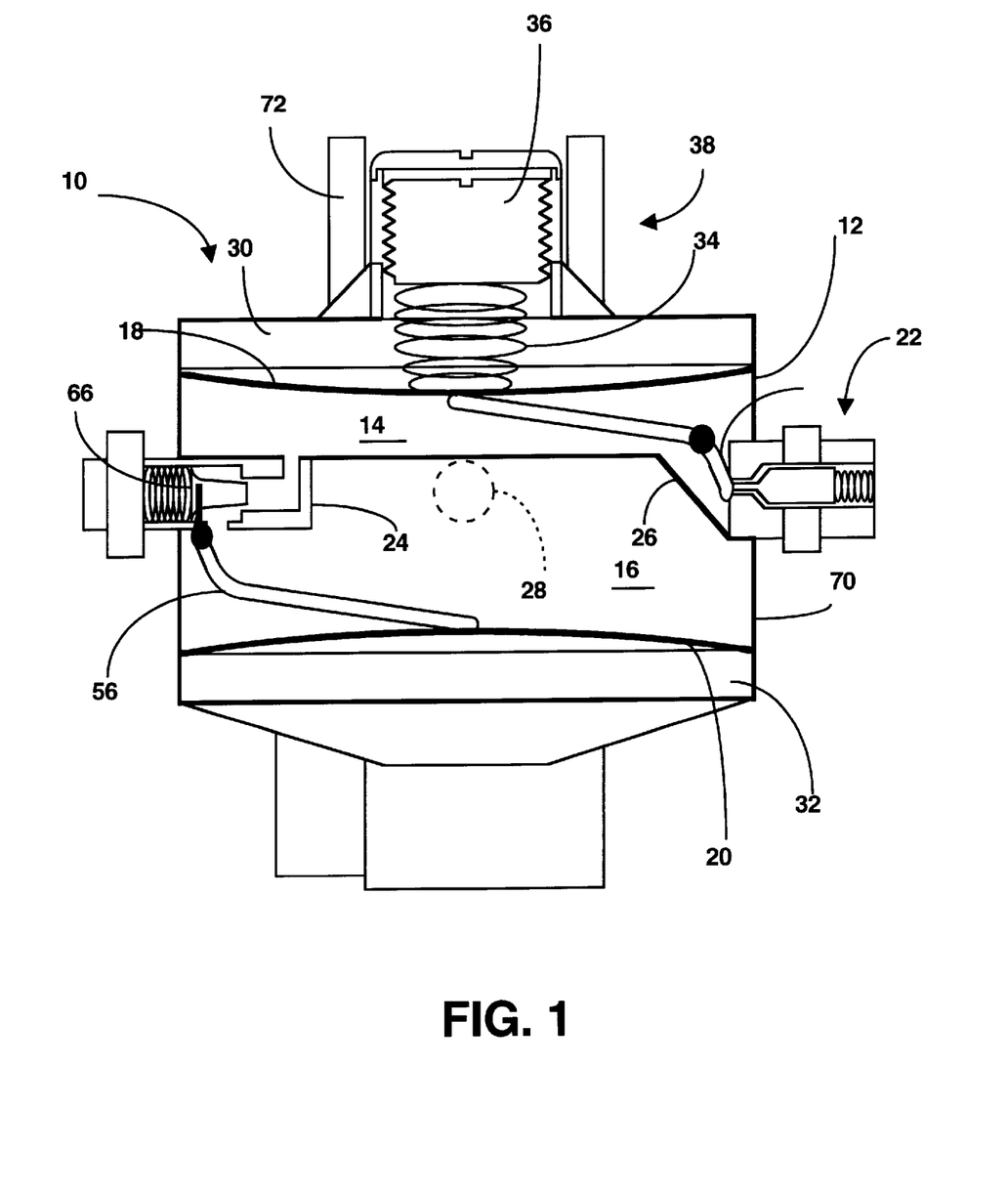
FIG. 1 is a side cut-away view of the fuel regulator.

The supplemental fuel regulator is shown in FIG. 1 in schematic view, and is designated as 10. The fuel regulator 10 includes a generally cylindrical body casing 12, as shown in FIG. 1. The body casing 12 has a body wall 70, which is cylindrical in shape. The body casing 12 is divided by a partition wall 26, which forms a first chamber 14, and a second chamber 16 on either side of the partition wall. A first diaphragm 18 seals off the first chamber 14, and is covered by a first end cap 30, which is screwed to the body casing 12. The first end cap 30 is circular in shape, and fits against the edges of the cylindrical body casing 12. The first end cap 30 has a housing 72, which is cylindrical in shape and mounted in the center of the first end cap 30. Inside the housing 72 is a spring tensioning screw 38, which comprises the pressure spring adjusting means 36. Located under the spring tensioning screw 38 is a pressure spring 34, which presses against the first diaphragm 18. Connected to the side of the first diaphragm 18 which is closest to the partition wall 26, a fuel inlet valve lever 54 is attached. An end of the fuel inlet valve lever 54 interacts with a plunger 66 of the fuel inlet valve. Details of the fuel inlet valve 22 are best seen in FIG. 6.

Figure 2:
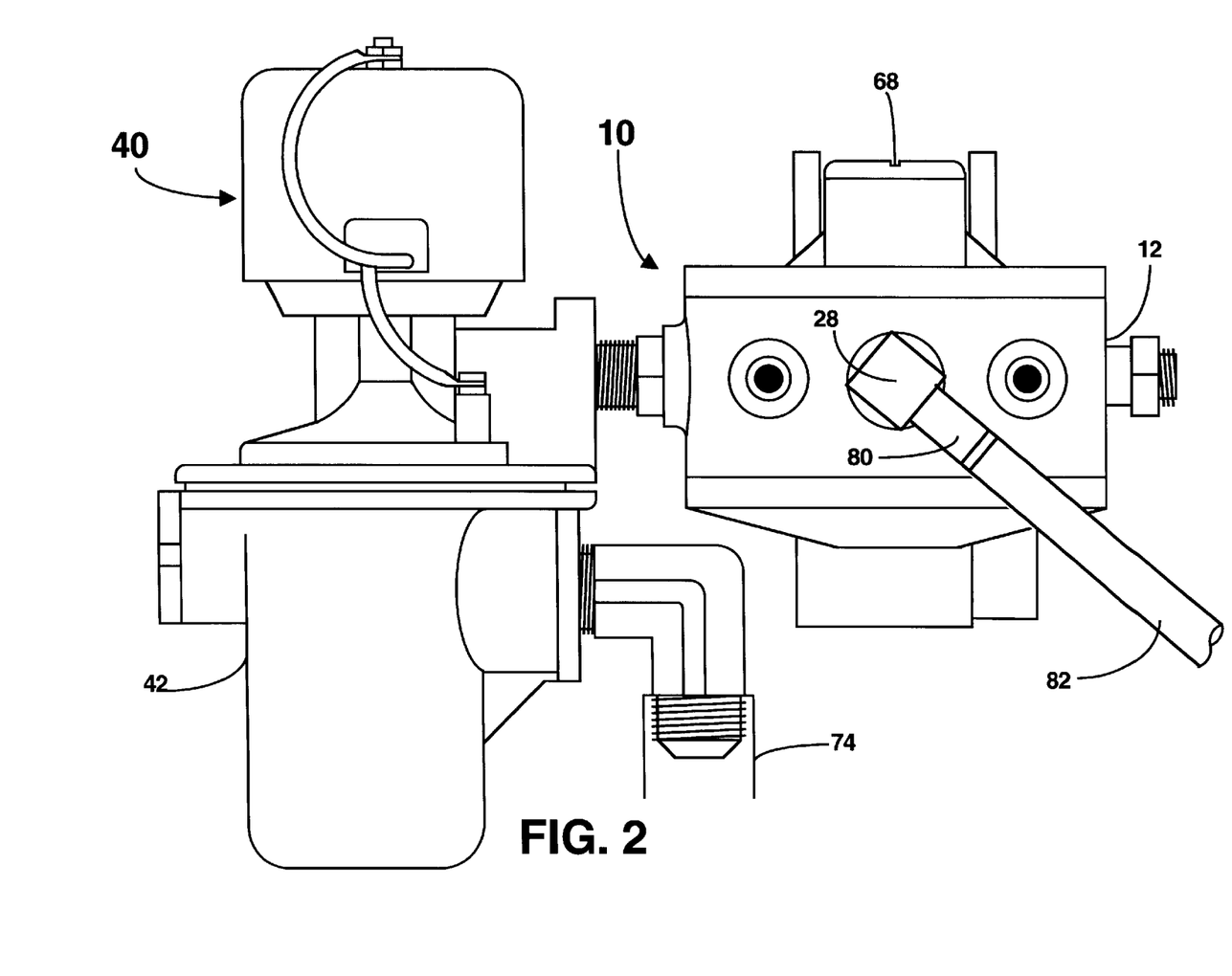
FIG. 2 is a side view of the regulator and the solenoid.
Figure 6:
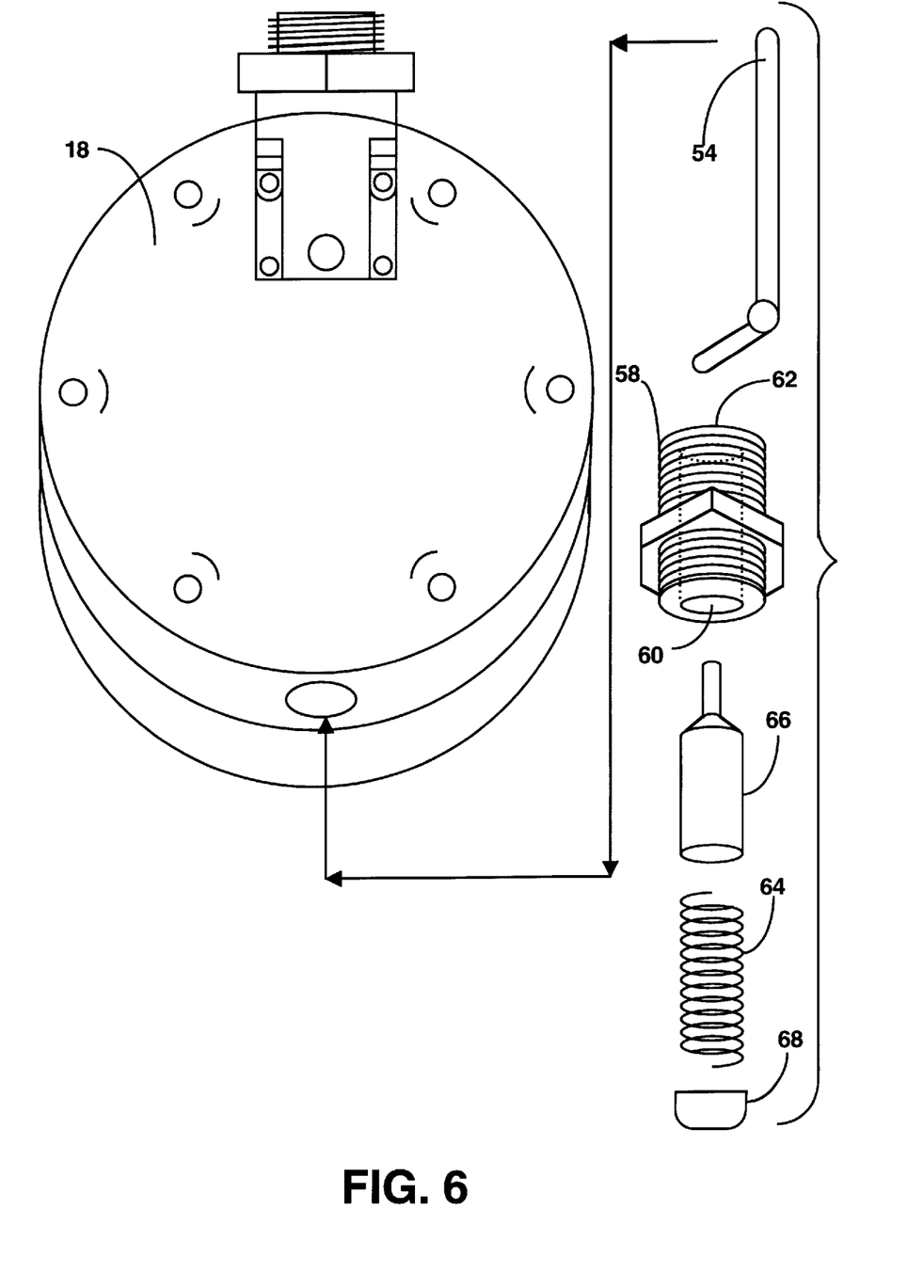
FIG. 6 is an exploded view of the fuel inlet valve.

The fuel inlet valve 22 shown in FIG. 6 includes the fuel inlet valve lever 54, a cylindrical valve body 58, which is threaded on the outside, and which defines a cylindrical orifice 60, which passes through the valve body 58. The orifice 60 tapers to a smaller diameter at the outlet end. A plunger 66 is located inside the valve body 58, and inside the orifice 60. The plunger 66 is cylindrical, with two different diameter portions, and a sloping shoulder between the two different diameter portions. The plunger 66 is free to move back and forth inside the orifice 60. The plunger 66 is pressed against a plunger seat 62, which is formed at one end of the orifice 60. A spring 64 presses the plunger 66 into the plunger seat 62. A cap 68 holds the spring 64 and the plunger 66 in place within the orifice 60, and also serves to bias the spring 64. A fuel inlet line 74 from a fuel tank 76 is connected to the fuel control valve 22. In a preferred embodiment, the fuel inlet line attaches to a solenoid 40, as shown in FIG. 2, before attaching to the fuel inlet valve 22. In the preferred embodiment, the solenoid 40 is a 12 volt solenoid which opens and closes the supply of fuel to the regulator 10 by use of an electrical switch 78.

The introduction of gaseous fuel into the first chamber 14 of the regulator 10 is controlled by the fuel inlet valve 22 in the following manner. Fuel from the propane tank flows as a gas through the fuel inlet line 74 to the solenoid 40. When the switch 78 is closed, the solenoid 40 opens, and allows fuel to continue on to the fuel control inlet valve 22 of the switch 78. At the fuel inlet valve 22, the spring 64 presses the plunger 66 against the plunger seat 62, sealing the orifice 60 and preventing flow of fuel through the valve body 58. The fuel inlet valve lever 54 presses against one end of the plunger 66, and pushes the plunger 66 away from the plunger seat 62, and opens the passage for fuel through the orifice 60. As fuel from the fuel tank 76 flows into the first chamber 14, the pressure in the first chamber 14 increases, and begins to deflect the first diaphragm 18 away from the partition wall 26. The deflection of the first diaphragm 18 is resisted by the pressure spring 34. When the pressure in the first chamber 14 exceeds the resistance of the pressure spring 34, the first diaphragm 18 moves away from the partition wall 26. When this happens, the fuel inlet valve lever 54 rotates away from the fuel inlet valve 22, and allows the plunger 66 to contact the plunger seat 62. When the plunger 66 contacts the plunger seat 62, the flow of gas into the first chamber 14 ceases.

Located in the partition wall 26 is a fuel control valve 24. The fuel control valve 24 controls the flow of fuel from the first chamber 14 into the second chamber 16. Like the first chamber 14, the second chamber 16 is closed at one end by a second diaphragm 20, as shown in FIG. 1. A second end cap 32 is also attached to the body wall 70 of the second chamber 20, by screws.

Figure 5:
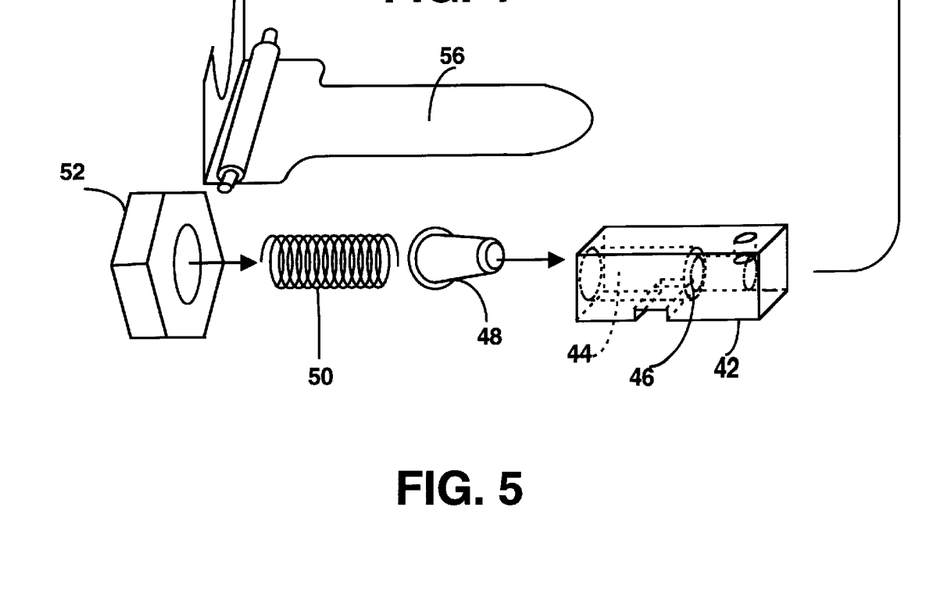
FIG. 5 is an exploded view of the fuel control valve.

The fuel control valve 24 is shown in exploded view in FIG. 5. It includes a rectangular valve body 42 through which an orifice 44 is formed. The orifice 44 is cylindrical, with passages which connect the cylindrical portion of the orifice 44 with a face of the valve body 42, which faces into the first chamber 14, and another connecting passage which faces into the second chamber 16. Inside the orifice a control tube 48 is placed, which is tubular, and which fits snugly against a valve seat 46. The control tube 48 is pressed in place by a spring 50, which is held in place by a nut 52. A fuel control valve lever 56 articulates with the control tube 48, so that as fuel control valve lever 56 rotates back and forth, it causes the control tube 48 to move in and out of the orifice 44. One end of the fuel control valve lever 56 is attached to the center of second diaphragm 20, on the side facing the partition wall 26. The body wall 70 of the second chamber 16 is penetrated by a fuel outlet port 28. The fuel outlet port 28 includes an L connection and a hose barb 80. A vacuum line 82 from the diesel engine 84 attaches to the hose barb 80.

Figure 3:
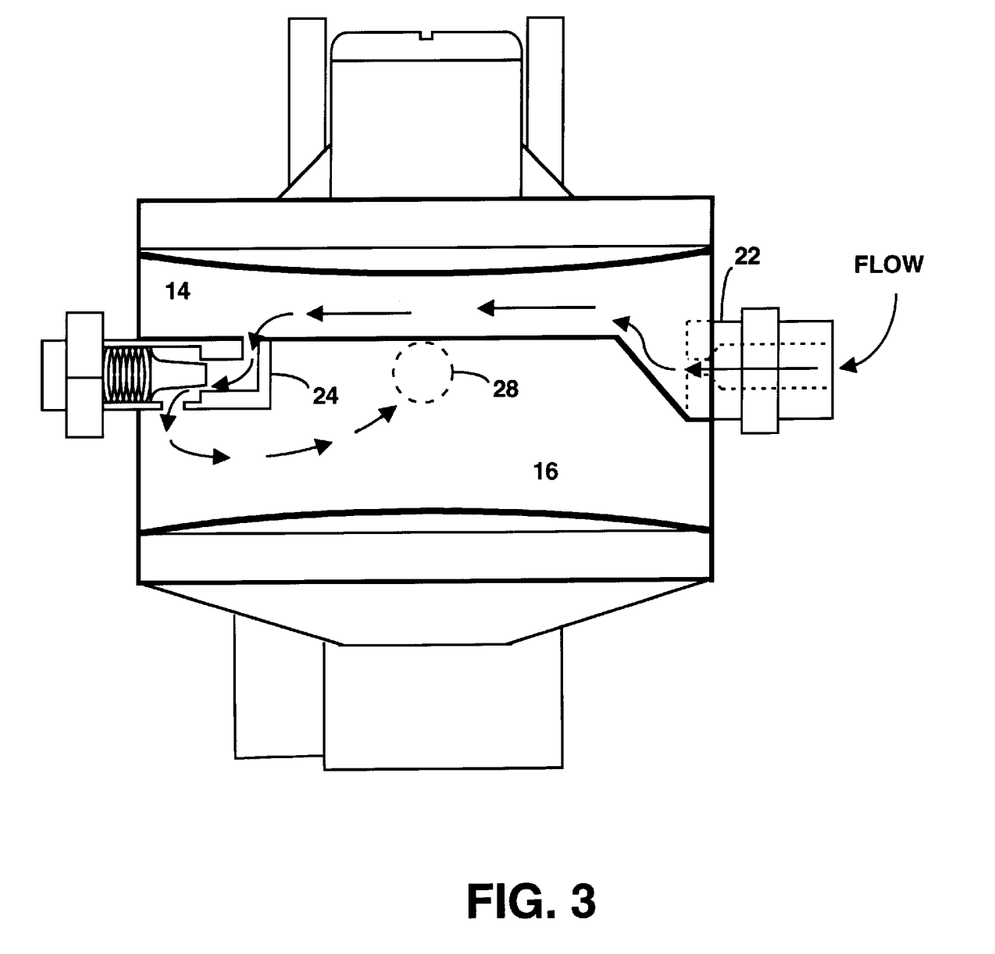
FIG. 3 is a side view of the regulator showing the flow of fuel through the regulator.
Figure 4:
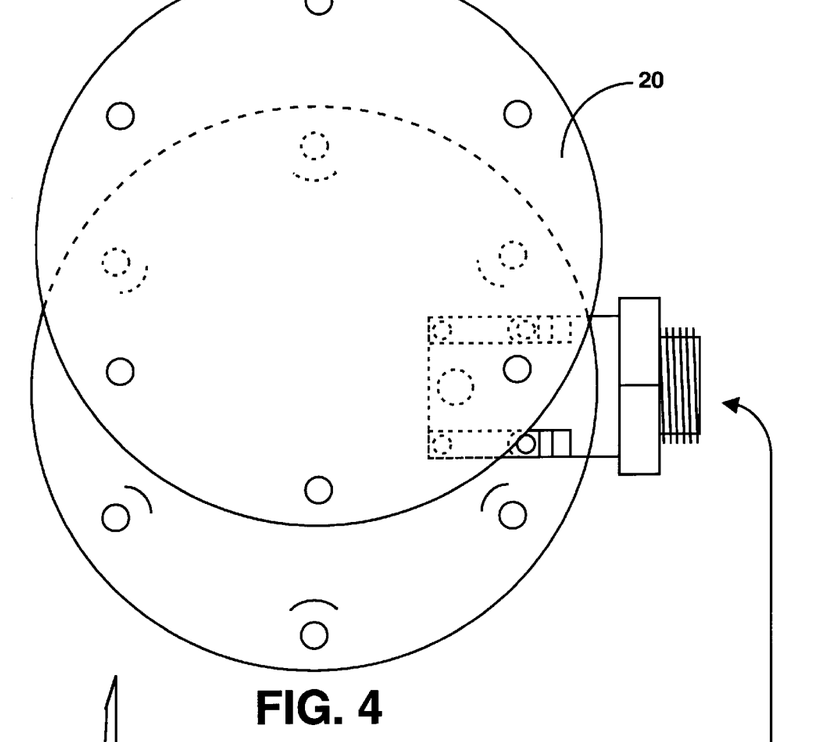
FIG. 4 is a top view of the regulator.

As the diesel engine 84 increases in RPM, the vacuum transmitted to the regulator 10 through the vacuum line 82 increases. As the vacuum increases, fuel from inside the second chamber 16 is drawn into the vacuum line 82 and pulled into the diesel engine 84. As the vacuum draws fuel out of the second chamber 16, it pulls the second diaphragm 20 towards the partition wall 26. As the second diaphragm 20 moves toward the partition wall 26, the attached fuel control valve lever 56 rotates around a pivot point, and pushes the control tube 48 away from the tube seat 46. This opens a passageway in the fuel control valve 44, and allows fuel from first chamber 14 to flow through the fuel control valve 24 and into the second chamber 16. In this way, demand from the engine is transmitted by a vacuum from the engine, which also serves to draw fuel from the regulator, and control the flow of fuel through the regulator. FIG. 3 shows the flow of this fuel through the regulator, as it passes through the fuel inlet valve 22, through the first chamber 14, through the fuel control valve 24, and into the second chamber 16, and through the fuel outlet port 28, and into the diesel engine 84.

Figure 7:
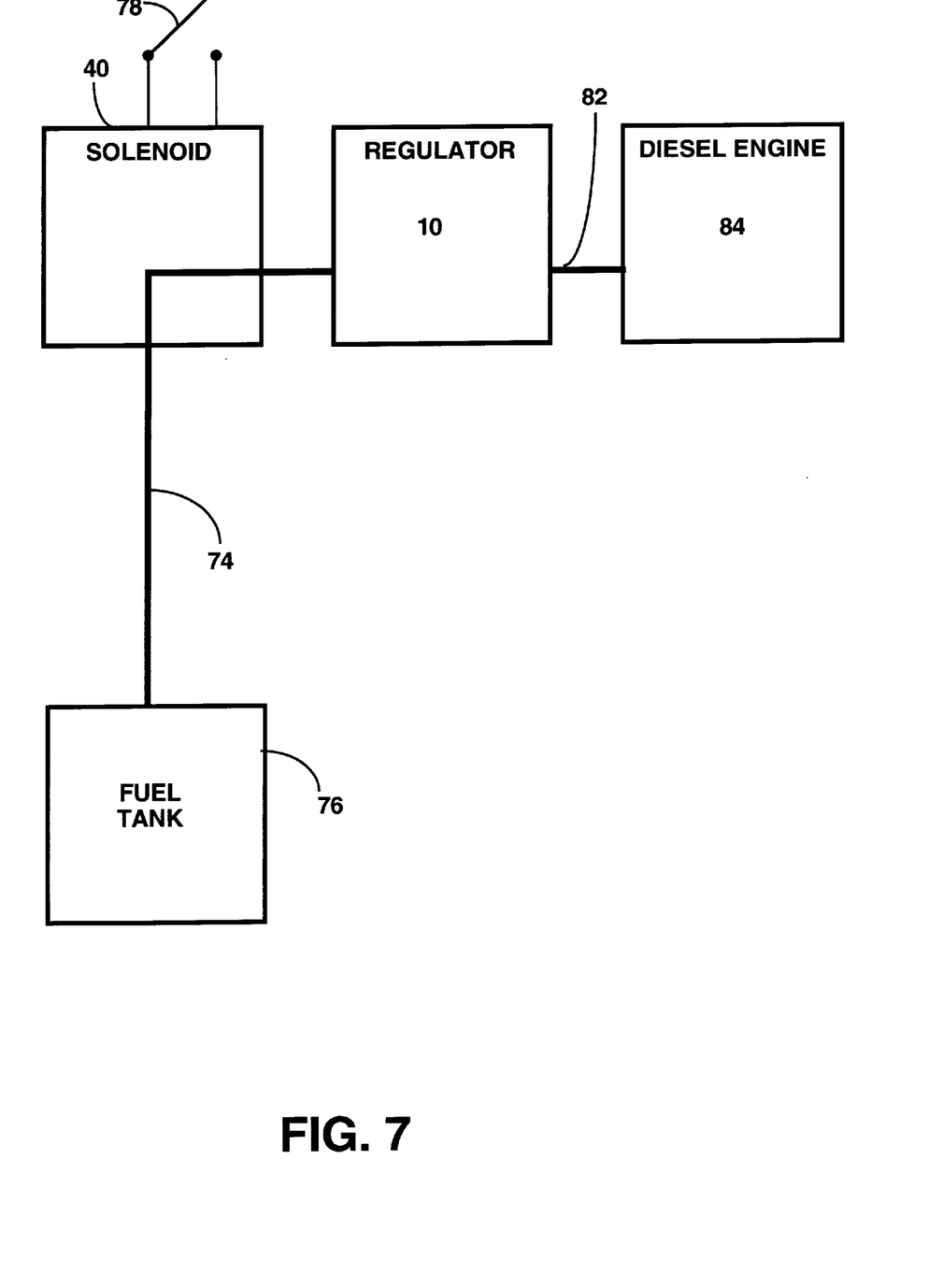
FIG. 7 is a diagrammatic representation of the supplemental fuel system.

FIG. 2 shows the preferred configuration of the solenoid 40 and the regulator 10. FIG. 7 shows the supplemental fuel system 86, which includes a fuel tank 76, a fuel inlet line 74, solenoid 40, a switch 78 controlling the solenoid 40, a fuel regulator 10, a vacuum line 82, and the diesel engine 84.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

I claim:

1. A regulator for adding supplemental fuel from a fuel tank into an airflow duct which feeds air into a diesel engine for combustion as a supplemental fuel, comprising:

a body casing having oppositely facing first and second recesses separated by a partition wall;

a first diaphragm which forms one side of said first recesses to provide a first chamber, into which fuel from said fuel tank is admitted;

a first end cap which attaches to said body casing, which encloses said first diaphragm, and which includes a spring which presses against said first diaphragm, and a spring adjusting means for adjusting said spring, for applying variable and yielding pressure to said first diaphragm;

a maximum pressure adjusting means, which is adjustable by a user to select a maximum pressure of said fuel in said first chamber, in which said maximum pressure adjusting means comprises a diaphragm which is deflected by a spring; a spring tensioning screw which is used to adjustably bias said spring;

a lever which is attached to said diaphragm and operatively connected to said fuel inlet valve;

a fuel inlet valve, which admits fuel into said first chamber to maintain a pressure set by said maximum pressure adjusting means, which is comprised of:

a valve body which defines an orifice, with a plunger seat at one end, through which fuel flows;

a plunger which is tapered on one end, and which adjustably blocks said orifice by contacting said plunger seat;

a spring, which is biased to press said plunger into said plunger seat of said orifice; and a cap, which connects to said valve body and which holds said spring in biased engagement with said plunger inside said orifice of said valve body; wherein when said plunger is pressed away from engagement with said valve seat, fuel is allowed to flow through said orifice, and when plunger is pressed into said valve seat, fuel is blocked from flowing through said fuel inlet valve;

a second diaphragm which forms one side of said second recess to provide a second chamber, into which fuel from said first chamber is admitted, and from which fuel is routed to said airflow duct of said diesel engine;

a second end cap which attaches to said second chamber, and which encloses said second diaphragm;

a fuel control valve which is in said partition wall, which admits fuel into said second chamber from said first chamber at a rate controlled by a fuel flow adjusting means;

a fuel flow adjusting means which varies a rate of delivery of said fuel through said fuel control valve according to engine vacuum;

a fuel outlet port, which passes through said body casing wall in said second chamber, and is connected to a vacuum line from said diesel engine, and from which fuel is drawn from said second chamber into said airflow duct of said engine;

wherein said fuel regulator is located outside said airflow duct and provides supplemental fuel to a diesel engine.

2. The supplemental fuel regulator of claim 1 in which said fuel flow adjusting means comprises said lower diaphragm which is deflected based on engine demand, and which is attached to said fuel control valve by a fuel control valve lever, wherein when said engine demand increases or decreases, said diaphragm is moved in or out, and causes said fuel control valve lever to open or close said fuel control valve to admit more or less fuel from said first chamber into said second chamber.

3. The supplemental fuel regulator of claim 2 in which engine demand is transmitted to said fuel flow adjusting means by means of a vacuum transmitted from said diesel engine to said fuel control means.

4. The supplemental fuel regulator of claim 1 in which said fuel control valve comprises:

a valve body which defines an orifice through which fuel flows and which includes a plunger seat;

a plunger which adjustably blocks said orifice; and a spring which is biased to press said plunger into said plunger seat of said orifice; wherein when said plunger is pressed away from engagement with said valve seat, fuel is allowed to flow through said orifice, and when plunger is pressed into said valve seat, fuel is blocked from flowing through said fuel inlet valve.

5. The supplemental fuel regulator of claim 1 which further includes a solenoid for activation or deactivation of said fuel regulator.

* * * * *